United States Patent Office 3,294,867
Patented Dec. 27, 1966

3,294,867
MAR-RESISTANT POLYESTER RESINS
Alexander Christian Bristol, Stamford, and Allan Ellis Sherr, Norwalk, Conn., and William George Deichert, Flushing, N.Y., assignors to American Cyanamid Company, Stamford, Conn., a corporation of Maine
No Drawing. Filed May 10, 1965, Ser. No. 454,714
9 Claims. (Cl. 260—868)

This invention relates to a novel composition of matter comprising a blend of (A) an unsaturated polyester resin comprising the esterification product of triethylene glycol and fumaric acid, (B) ethyl acrylate, (C) allyl methacrylate, and (D) triallyl cyanurate. Still further, this invention relates to a substantially linear, water-insoluble, non-gelled unsaturated polyester resin composition comprising a blend of the aforesaid polyester resin with three different copolymerizable monomers. Still further, this invention relates to a hard mar-resistant cross-linked unsaturated polyester resin prepared from the composition set forth hereinabove. Still further, this invention relates to articles of manufacture comprising a substrate coated with the unsaturated polyester resin composition of the present invention and converted to the hard mar-resistant cross-linked state.

One of the objects of the present invention is to produce a composition matter comprising a blend of (A) an unsaturated polyester resin comprising the esterification reaction product of triethylene glycol and fumaric acid wherein the fumaric acid is substantially the only dicarboxylic acid present, (B) ethyl acrylate, (C) allyl methacrylate, and (D) triallyl cyanurate. A further object of the present invention is to produce a hard mar-resistant cross-linked polyester resin product from the aforementioned polyester resin composition. A still further object of the present invention is to produce cast objects from the polyester resin composition of the present invention. A still further object of the present invention is to produce articles of manufacture comprising a base member coated with the aforementioned hard mar-resistant cross linked polyester resin. These and other objects of the present invention will be discussed in greater detail hereinbelow.

The polyester resin composition of the present invention has as its first component the unsaturated polyester resin prepared by reacting triethylene glycol with fumaric acid. These two reactants are essential in producing the hard mar-resistant surfaces in the ultimate product produced and other seeming equivalent materials, such as other glycols, including ethylene glycol, diethylene glycol, and the like, will not give the results that the triethylene glycol produces. By the same token, the fumaric acid is a necessary component the polyester resin used in the present invention. Comparable α,β-ethylenically unsaturated dicarboxylic acids which for other purposes may be the full equivalent of fumaric are far from being comparable for the purposes of the present invention. Acids, such as maleic, aconitic, itaconic, chloro maleic, and the like, cannot be substituted for the fumaric and still produce the unexpected results which the present polyester resin composition produces. As a consequence, the fumaric acid should be the only dicarboxylic acid present in the polyester resin. It is recognized that comparatively small amounts of other acids can be tolerated, such as trace amounts up to about 5%, by weight, based on the total weight of the acid component, can be tolerated without diminishing significantly the excellent properties achieved in the ultimate products produced from the composition of the present invention. Other discarboxylic acids, such as those which are free of non-benzenoid unsaturation can also be used in the same minor amounts, namely, from about a trace of about 5%. Included in this latter group are such dicarboxylic acids as phthalic, adipic, succinic, and the like.

The triethylene glycol can be used as the sole glycol in the polyester resin used in the present invention and, preferably, no other glycols should be used except in small amounts, such as a trace to about 5% based on the total weight of glycols. An exception to this provision exists with respect to two glycols only. These glycols are 2-ethyl-1,3-hexanediol and neopentyl glycol, which is otherwise known as 2,2-dimethyl-1,3-propanediol. These two exceptions can be used in amounts varying from about a trace to about 50 mole percent based on the total number of moles of glycols used.

The amount of the polyester resin used in the composition of the present invention may be varied between about 60%, by weight (solids), and 90%, by weight, based on the total unsaturated polyester resin composition. The remaining amounts of the composition, namely, from about 40%, by weight, to about 10%, by weight, is made up of the three different copolymerizable monomers.

The first polymerizable monomer used in the composition of the present invention is ethyl acrylate and may be present in the composition of the present invention in amounts varying between about 3% and 30%, by weight, based on the total weight of the composition (solids).

The second polymerizable monomer used in the present invention is allyl methacrylate and should also be present in the composition of the present invention in amounts varying between 3%, by weight, and 30%, by weight, based on the total weight of the resinous composition (solids).

The third polymerizable monomer essential to the composition of the present invention is triallyl cyanurate. This monomer may be used in amounts varying between about 1% and 20%, by weight, based on the total weight of the composition.

When preparing the mixture of the monomers, it should be kept in mind that the minimum total weight of the monomers should be not less than 10% and the maximum total percentage, by weight, of the monomers should not exceed about 40%. Although the ethyl acrylate and the allyl methacrylate function as cross-linking monomers, as does the triallyl cyanurate, the former two polymerizable monomers serve a second purpose, namely, as a solvent medium for the triallyl cyanurate in order to achieve a uniform dissolution of the triallyl cyanurate and the other two monomers in the triethylene glycol-fumarate polyester resin. A still further function of the allyl methacrylate and the ethyl acrylate is to lower the viscosity of the composition of the present invention to a viscosity suitable for application in a coating operation whenever the compositions of the present invention are selected for such use.

If desired, a fourth monomer may be used, namely, glacial methacrylic acid. The amount of the glacial methacrylic acid which may be used may be varied between about 0.01% and 5.0%. The addition of this fourth monomer to the total composition should not upset the balance of the parts, by weight, of the total composition outlined in significant detail hereinabove, and when the glacial methacrylic acid is used, the total percentage, by weight, of the four monomers should be varied between about 10%, by weight, and 40%, by weight, based on the total weight of the composition.

It has been pointed out hereinabove that the substantially linear, water-insoluble, non-gelled unsaturated polyester resin composition of the present invention can be converted to a hard mar-resistant resinous product. This conversion from the ungelled or thermosetting state to the hard thermoset state can be accomplished by the application of heat and/or pressure with or without catalysis.

Still further, the thermosetting material can be converted to the thermoset state by use of catalysts or initiators only without resorting to either heat or pressure. Still further, if desired, a combination of the catalyst, initiator, heat and pressure may be used for certain purposes. The catalytic materials or polymerization initiators which would be used to make such a convention in state are well-known in the art and have been used extensively for this purpose in collateral compositions. Illustrative catalysts are the peroxide catalysts, such as benzoyl peroxide, tertiary butyl hydroperoxide, ditertiary butyl peroxide, and cumene hydroperoxide, among many others. The ketone peroxides may also be used such as, the methyl ethyl ketone peroxide, the diethyl ketone peroxide, and the like. The amounts of the catalytic material used will be conventional such as between about 0.01% and 10% and more usually between about 0.1% and 3%, by weight, based on the weight of the polymerizable composition.

The polymerizable polyester resin compositions of the present invention will have utility in many areas such as in coatings, moldings, castings, and the like. One of the principal end uses for the polymerizable polyester resin compositions of the present invention is in the area of coating substrates that have a transparent characteristic in order to impart to said substrate a hard mar-resistant surface. More particularly, the polymerizable polyester resin compositions of the present invention can be used to coat glass for window purposes or for television implosion shields, and the like. Additionally, one can use the polymerizable compositions of the present invention to coat lenses as in eye glasses, including sunglasses, binoculars and telescopes, and the like. Still further, these polymerizable compositions may be used to coat sheets of synthetic plastic materials such as sheets of polystyrene or poly(methyl methacrylate), and the like. If desired, the polyester resin compositions of the present invention may have incorporated therein, ultraviolet light absorbers of which a substantial plurality are well-known in the art. A significant number of these ultraviolet absorbers are disclosed in the Day et al. U.S. Patent 2,777,828. The amounts used are now conventional and are set forth in the aforemenioned reference. If desired, particularly for show-window purposes and sunglasses, photchromic materials may be incorporated into the polymerizable resin of the present invention thereby permitting changes from a colored glass to a clear glass and vice versa, due to the absence or presence of light, including sunlight. If a permanent coloration is desired in the polymerizable polyester resins of the present invention, that will not defeat the principal desired end use, namely, transparency, certain dyes and/or pigments may be dissolved in the unsaturated polymerizable polyester resin in order to achieve a tinting. Furthermore, the polyester resin compositions of the present invention can be rendered translucent or even opaque by use of the appropriate selection of filler and/or pigment in the desired kind and amount especially when being used as a coating for substrates such as wood, metal and opaque-filled plastic articles.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

POLYESTER RESIN "A"

Into a suitable reaction vessel equipped with thermometer, stirrer, inert gas inlet and outlet tubes, there is introduced 126 parts of triethylene glycol and 93 parts of fumaric acid. The charge is heated at about 150–200° C. for a twenty-four hour period, while bubbling carbon dioxide gas through the reaction mixture so as to provide an inert atmosphere. At the end of the reaction period, the product, having an acid number of 17, is a light yellow viscous liquid.

*Example 1*

Into a suitable mixing vessel, there is introduced 296 parts of Resin "A," 60 parts of ethyl acrylate, 24 parts of allyl methacrylate, 20 parts of triallyl cyanurate and 0.1 part of glacial methacrylic acid. After thoroughly blending the materials together, they are catalyzed by the addition of 8 parts of benzoyl peroxide. The catalyzed composition is then poured into a casting shell and is heated for sixteen hours at 60° C. followed by one hour at 100° C. After the one hour of heating at 100° C., the casting was then heated gradually to 135° C. prior to the removal from the oven. The cast sheet is removed from the oven, cooled to room temperature and then subjected to a series of tests. The Barcol hardness of the sheet is 35–31. The original haze is 1.25%. The haze increase after 10 revolutions in the Taber test is 1.4%. The haze increase after 100 revolutions in the Taber test is 7.85%. The haze increase after 200 revolutions in the Taber test is 18.15%. The APHA color is 156.

*Example 2*

A cast sheet is prepared again according to the process of Example 1, except that there is used the following ingredients: 42.5 parts of Polyester Resin "A," 28.3 parts of ethyl acrylate, 12.0 parts of allyl methacrylate, 8.0 parts of triallyl cyanurate, 0.05 part of glacial methacrylic acid and 0.9 part of benzoyl peroxide. The cast sheet was subjected to the tests as in Example 1 and revealed a Barcol hardness of 30–27. The original haze is 1.3%. The increase in haze after 10 revolutions in the Taber test is 0.9%. The increase in haze after 100 revolutions in the Taber test is 11.2%. The increase in haze after 200 revolutions is 30.7%. The APHA color is 143.

POLYESTER RESIN "B"

Into a suitable reaction vessel equipped as in Polyester Resin "A," there is introduced 32 parts of 2-ethyl-1,3-hexanediol, 628 parts of triethylene glycol, and 464 parts of fumaric acid. The procedure of Polyester Resin "A" is repeated in all essential details and at the end of the reaction the product, having an acid number of about 20, is a light yellow viscous liquid.

*Example 3*

Example 1 is repeated in all essential details except in the place of Polyester Resin "A" there is substituted an equal amount of Polyester Resin "B." The cooled cast sheet has a Barcol hardness of 33, a Deichert-Webb [1] mar-resistance of 3. The increase in haze after 10 revolutions in the Taber test is 0.3% and the sample was unchanged after exposure for 748 hours in a fluorescent ultraviolet weatherometer (FUW).

POLYESTER RESIN "C"

Into a suitable reaction vessel equipped as in Polyester Resin "A," there is introduced 483 parts of 2-ethyl-1,3-hexanediol, 496 parts of triethylene glycol, and 696 parts of fumaric acid. The procedure of Polyester Resin "A" is repeated in all essential details resulting in a product having an acid number of about 24.

*Example 4*

Example 1 is repeated in all essential details except that Polyester Resin "C" is substituted for Polyester Resin "A" in equal amounts. The cooled sheet has a Barcol hardness of 35 and a Deichert-Webb mar-reistance of 2. The increase of haze after 10 revolutions is 0.55%. The sample was unchanged after exposure for 1061 hours in a fluorescent ultraviolet weatherometer (FUW).

---

[1] See U.S. patent application S.N. 390,037, filed Aug. 17, 1964.

POLYESTER RESIN "D"

Into a suitable reaction vessel equipped as in Polyester Resin "A," there is introduced 121 parts of 2-ethyl-1,3-hexanediol, 702 parts triethylene glycol, and 581 parts of fumaric acid. The procedure of Polyester Resin "A" is repeated in all essential details until the product has an acid number of about 19.

*Example 5*

Example 1 is repeated in all essential details except that in the place of Polyester Resin "A" there is substituted an equal amount of Polyester Resin "D." The cooled cast sheet has a Barcol hardness of 33 and a Deichert-Webb mar-resistance of 3. The increase in haze after 10 revolutions in the Taber test is 1.2% and the sample was unchanged after 442 hours in the FUW.

POLYESTER RESIN "E"

Into a suitable reaction vessel equipped as in Polyester Resin "A," there is introduced 429 parts of neopentyl glycol, 619 parts of triethylene glycol and 928 parts of fumaric acid. The procedure of Polyester Resin "A" is repeated in all essential details until the product is produced having an acid number of about 26.

*Example 6*

Example 1 is repeated in all essential details except that in the place of Polyester Resin "A" there is substituted an equal quantity of Polyester Resin "E." The cooled cast sheet has a Barcol hardness of 50 and a Deichert-Webb mar-resistance of 0. The sample was unchanged after 1612 hours in the FUW.

We claim:

1. A composition of matter consisting essentially of a blend of (A) from about 60% to about 90%, by weight, of an unsaturated polyester resin consisting essentially of the esterification product of triethylene glycol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight, of triallyl cyanurate, wherein the percentages, by weight, are based on the total weight of the composition and wherein the total percentages, by weight, of (B), (C) and (D) is between about 10% and 40%, by weight, same basis.

2. A composition of matter consisting essentially of a blend of (A) from about 60% to about 90%, by weight, of an unsaturated polyester resin consisting essentially of the esterification product of triethylene glycol, 2-ethyl-1,3-hexanediol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight, of triallyl cyanurate, wherein the percentages, by weight, are based on the total weight of the composition and wherein the total percentages, by weight, of (B), (C) and (D) is between about 10% and 40%, by weight, same basis.

3. A composition of matter consisting essentially of a blend of (A) from about 60% to about 90%, by weight, of an unsaturated polyester resin consisting essentially of the esterification product of triethylene glycol, neopentyl glycol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight, of triallyl cyanurate, wherein the percentages, by weight, are based on the total weight of the composition and wherein the total percentages, by weight, of (B), (C) and (D) is between about 10% and 40%, by weight, same basis.

4. A hard mar-resistant cross-linked unsaturated polyester resin composition consisting essentially of the cured reaction product (A) from about 60% to about 90%, by weight, of an unsaturated polyester resin consisting essentially of the esterification product of triethylene glycol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight, of triallyl cyanurate, wherein the percentages, by weight, are based on the total weight of the composition and wherein the total percentages, by weight, of (B), (C) and (D) is between about 10% and 40%, by weight, same basis.

5. A hard mar-resistant cross-linked unsaturated polyester resin composition consisting essentially of the cured reaction product of (A) from about 60% to about 90%, by weight, of an unsaturated polyester resin consisting essentially of the esterification product of triethylene glycol, 2-ethyl-1,3-hexanediol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight, of triallyl cyanurate, wherein the percentages, by weight, are based on the total weight of the composition and wherein the total percentages, by weight, of (B), (C) and (D) is between about 10% and 40%, by weight, same basis.

6. A hard mar-resistant cross-linked unsaturated polyester resin composition consisting essentially of the cured reaction product of (A) from about 60% to about 90%, by weight, of an unsaturated polyester resin consisting essentially of the esterification product of triethylene glycol, neopentyl glycol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight of triallyl cyanurate, wherein the percentages, by weight, are based on the total weight of the composition and wherein the total percentages, by weight, of (B), (C) and (D) is between about 10% and 40%, by weight, same basis.

7. A sheet of poly(methyl methacrylate) having bonded thereto a hard mar-resistant cross-linked unsaturated polyester resin composition consisting essentially of the cured reaction product of (A) from about 60% to about 90%, by weight, of an unsaturated polyester resin consisting essentially of the esterification product of triethylene glycol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight, of triallyl cyanurate, wherein the percentages, by weight, are based on the total weight of the composition and wherein the total percentages, by weight, of (B), (C) and (D) is between about 10% and 40%, by weight, same basis.

8. A sheet of poly(methyl methacrylate) having bonded thereto a hard mar-resistant cross-linked unsaturated polyester resin composition consisting essentially of the cured reaction product of (A) from about 60% to about 90%, by weight, of an unsaturated polyester resin consisting essentially of the esterification product of triethylene glycol, 2-ethyl-1,3-hexanediol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight, of triallyl cyanurate, wherein the percentages, by weight, are based on the total weight of the composition and wherein the total percentages, by weight, of (B), (C) and (D) is between about 10% and 40%, by weight, same basis.

9. A sheet of poly(methyl methacrylate) having bonded thereto a hard mar-resistant cross-linked unsaturated polyester resin composition consisting essentially of the cured reaction product of (A) from about 60% to about 90%, by weight, of an unsaturated polyester resin consisting essentially of the esterification product of triethylene glycol, neopentyl glycol and fumaric acid wherein the fumaric acid is substantially the only dicarboxylic acid present, (B) from about 3% to about 30%, by weight, of ethyl acrylate, (C) from about 3% to about 30%, by weight, of allyl methacrylate, and (D) from about 1% to about 20%, by weight, of triallyl cyanuarate, wherein the percentages, by weight, are based on the total weight of the composition and wherein the total percentages, by weight, of (B), (C) and (D) is between about 10% and 40%, by weight, same basis.

No references cited.

MURRAY TILLMAN, *Primary Examiner.*

J. T. GOOLKASIAN, *Assistant Examiner.*